United States Patent [19]

Stowell et al.

[11] 4,140,773
[45] Feb. 20, 1979

[54] PRODUCTION OF HIGH PORE VOLUME ALUMINA SPHERES

[75] Inventors: Donald E. Stowell; Larry L. Bendig, both of Ponca City, Okla.; John F. Scamehorn, Austin, Tex.

[73] Assignee: Continental Oil Company, Ponca City, Okla.

[21] Appl. No.: 880,830

[22] Filed: Feb. 24, 1978

[51] Int. Cl.$^2$ ................................................ C01F 7/02
[52] U.S. Cl. ...................................... 423/628; 264/15; 423/630; 252/463
[58] Field of Search .................. 423/628, 630; 264/15

[56] References Cited

U.S. PATENT DOCUMENTS

| | | | |
|---|---|---|---|
| 2,805,920 | 9/1957 | Richardson | 423/630 |
| 3,317,277 | 5/1967 | Cosgrove | 264/15 |
| 3,419,352 | 12/1968 | Acciarri | 423/630 |

*Primary Examiner*—Herbert T. Carter
*Attorney, Agent, or Firm*—Cortlan R. Schupbach, Jr.

[57] ABSTRACT

High macro-pore content spheres (>1000Å) are produced by use of a rotating wheel, wherein dry alumina is dropped onto the wheel under a peptizing spray misted onto the wheel through an atomizing device. Compressive stresses normally encountered in procedures such as pelletizing are avoided, thereby preserving macro-pores. Size of spheres can be adjusted by altering, for example, the angle at which the wheel rotates.

3 Claims, No Drawings

PRODUCTION OF HIGH PORE VOLUME ALUMINA SPHERES

This invention relates to a method for producing alumina spheres having a high content of pores above 1000 angstroms in diameter. More particularly, this invention relates to a method for producing alumina having a high content of pores above 1000 angstroms in size by utilizing high alkoxide injection velocity to hydrolyze aluminum alkoxides to form a high pore volume alumina powder and then dropping the dried high pore volume alumina onto a rotating wheel under a peptizing spray to obtain high pore volume spheres.

Alumina catalysts having a high content of large pores above 1000 angstroms in diameter are desirable for many purposes. In particular, the liquid phase methylation of phenols to form methylated products such as cresols, 2,3,-6-trimethylphenol, and the like. However, production of these catalysts in pellet form is extremely difficult since the normal extrusion pressures necessary to form extrudates will normally collapse a large proportion of the large catalyst pores and form a catalyst not as suitable for the end purpose as is desired.

The aluminas of the instant invention are derived from the hydrolysis of aluminum alkoxides which procedure is generally described and exemplified in U.S. Pat. Nos. 3,264,063; 3,357,791; 3,419,352; 3,867,296; 3,907,512; 3,917,808; and 3,933,685. Production of high pore volume alumina is set forth in U.S. Pat. Nos. 3,975,509; 3,975,510; and 4,024,231. However none of these processes produce formed aluminas having the high macropore content of those produced by the instant invention. It would therefore be desirable to provide a simple and effective method for producing high macropore content formed alumina catalysts.

It is therefore an object of the instant invention to provide a simple and effective method for producing high macropore content alumina catalysts having from about 25 to about 40 percent of the pores above 1000 angstroms in diameter. Other objects will become apparent to those skilled in this art as the description proceeds.

It has now been discovered according to the instant invention that when aluminum alkoxides are hydrolyzed under conditions of high injection velocity, a high pore volume alumina is obtained whose pores can be preserved by forming spheres using a rotating wheel wherein dry alumina is dropped onto the wheel under a peptizing spray misted onto the wheel through an atomizing device. The preservation of the high pore volumes is surprising since extrudates made from low injection velocity alumina have a slightly greater pore volume than spheres made from the same alumina, while extrudates made from high injection velocity alumina have a lower pore volume than spheres made from the same alumina.

This method is particularly suitable for use with aluminum alkoxides prepared by oxidation of aluminum trialkyls prepared by the Ziegler process. The alkyl groups in these aluminum alkyls usually contain from 2 to 40 carbon atoms and a predominant amount of 8 to 16 carbon atom alkyls.

However, any aluminum alkoxide containing 2 or more carbon atoms in the alkoxy group can be used. Usually the alkoxy group contains a maximum of 40 carbon atoms, more usually a maximum of 30. In normal use the aluminum alkoxides are a mixture containing alkoxy groups of differing carbon content.

Whatever the aluminum alkoxide used, said alkoxide is admixed with water under high velocity conditions prior to passing the resulting admixture into the hydrolysis reactor. The term "high velocity" as used herein means admixing at greater than 40 feet per second, preferably greater than 100 feet per second. Preferred velocities are from about 40 to about 250 feet per second. The velocity is determined using the formula $V = f/pA$ wherein V is velocity, F is rate of flow in pounds per second, p is density in pounds of cubic foot, and A is orifice area in square feet.

The relative amounts of water used in the hydrolysis of aluminum alkoxide is in the range of about 0.5 to about 5 pounds of water per pound of aluminum alkoxide. In any event, a stoichiometric excess of water should be used to produce a pumpable slurry. The aluminum alkoxide normally sufficient to form a pumpable slurry is at a temperature in the range of about 50 to about 150° C. and the water is normally at a temperature in the range of about 40 to about 150° C.

The water/aluminum alkoxide admixture is then passed to the reactor, the remainder of the process being as described in the references cited. Concisely stated, a typical hydrolysis process is carried out wherein the aluminum alkoxides are hydrolyzed forming alumina and alcohols. At this point, a phase split occurs between the water-alumina slurry and the alcohols. The alcohols and alumina water phases are withdrawn from the reactor and the alumina water slurry is subjected to further processing to eventually obtain the dried alumina substantially free of alcohols.

At this point in the instant invention, a rotating wheel or similar mechanical configuration is used to produce a high pore volume content alumina pellet.

Concisely stated then, the instant invention relates to a method for producing alumina spheres having a high content of pores above 1000 angstroms in size comprising
 (a) utilizing high injection velocity to place aluminum alkoxides in a hydrolysis reactor,
 (b) allowing hydrolysis to occur, recovering alumina and drying to obtain a high pore volume powder, and
 (c) dropping the dried high pore volume alumina powder onto a rotating wheel under a peptizing spray misted onto the wheel.

The alumina spheres produced by the process of this invention will normally contain from about 25 to about 40 percentage of its pore volume above 1000 angstroms in size. However, preferred high pore volume content (above 1000 angstroms) is from about 30 to about 40 percentage of the total pore volume.

The peptizing spray misted onto the wheel can be any of the peptizing sprays known to those skilled in the art. Representative examples of such peptizing sprays are nitric acid, acetic acid, formic acid and the like. When misted onto the wheel the alumina powder-peptizer spray ratio is, by weight, from about 1.7 to about 2.4 respectively (based on 3% acid in spray).

The invention is more concretely described with reference to the examples below wherein all parts and percentages are by weight unless otherwise specified. The examples are provided to illustrate the instant invention and not to limit it.

In the examples carried out, high injection velocity alumina powder was obtained using the process described in detail above. Normal injection velocity alumina powder was obtained according to the processes described in the patents referenced wherein aluminum alkoxides and water were added to a hydrolysis reactor separately without attention to mixing velocity, and which is a normal commercial method of producing alumina.

All spheres were formed using a rotating wheel (Dravo wheel, trademark of and produced by Dravo Wheel Corporation). Operation of rotating wheels is a known commercial method which consists of dropping powder onto the moving wheel under a misting spray and allows the rotation of the wheel to form spheres of a given size. Size of the spheres are determined by the angle of rotation of the wheel, atomizer location and so forth.

Comparative examples were carried out using high injection velocity powder. Analysis was made of the powder before and after extruding and before and after spheroidizing on the wheel as described. One-eighth inch extrudates were produced and the spheres formed were about 0.211 inches in diameter. The results are set forth in Table 1 below, wherein Table 1 shows the pore volume analysis of a high alkoxide injection velocity powder and the extrudate formed therefrom, while examples 3 and 4 show a high alkoxide injection velocity powder and the spheres formed from said powder using a rotating wheel. The pore volume shown in the examples were determined by the Mercury Penetration Technique using pressures up to about 50,000 pounds per square inch gauge (psig). The tests were performed on a Mercury porosimeter, Model 905-1, manufactured by the Micrometrics Corporation of Norcross, Ga.

TABLE I

POWDER, EXTRUDATE, AND SPHERE ANALYSIS

| TEST | 1 High Alkoxide Injection Velocity Powder | 2 Extrudate From 1 | 3 High Alkoxide Injection Velocity Powder | 4 Spheroidization of 3 |
|---|---|---|---|---|
| Surface Area (m²/gm) | 348 | 322 | 282 | 302 |
| Pore Volume (cc/gm) | | | | |
| 50Å | 0.12 | 0.12 | 0.08 | 0.12 |
| 100Å | 0.37 | 0.41 | 0.35 | 0.34 |
| 250Å | 0.46 | 0.50 | 0.45 | 0.41 |
| 500Å | 0.51 | 0.54 | 0.49 | 0.45 |
| 1,000Å | 0.57 | 0.57 | 0.56 | 0.49 |
| 10,000Å | 0.96 | 0.58 | 0.86 | 0.81 |

Extrusion was then made of alumina powder produced by normal production methods (normal injection velocity). Four different samples were prepared and extruded. All extrusion mixes were made in a lab-size Baker-Perkins mix-muller with Sigma-type blades. The mix was extruded in a 2¼″ pin-barrel extruder.

In example 5, 850 grams of powder was mixed with 650 ml of 2.25 mole percent acetic acid for 5 minutes. The mixture was then extruded. Example 6 contained 850 grams of alumina powder mixed with 650 ml of distilled water for 5 minutes prior to extrusion. Example 7 was 850 grams of alumina powder mixed with 660 ml of 2.25 volume percent acetic acid for 3 minutes prior to extrusion. Example 8 was 850 ml of alumina powder mixed with 670 ml of 2.25 volume percent nitric acid for 2 minutes prior to extrusion. The pore volume distribution in cubic centimeters per gram determined as set forth above is shown in Table 2.

TABLE II

PORE VOLUME DISTRIBUTION OF COMMERCIAL ALUMINA EXTRUDATES

| | 5 | 6 | 7 | 8 | POWDER |
|---|---|---|---|---|---|
| 35–50Å | 0.12 | 0.14 | 0.06 | 0.06 | 0.14 |
| 35–100Å | 0.49 | 0.52 | 0.48 | 0.47 | 0.40 |
| 35–250Å | 0.50 | 0.55 | 0.51 | 0.48 | 0.41 |
| 35–500Å | 0.51 | 0.55 | 0.51 | 0.49 | 0.43 |
| 35–1,000Å | 0.52 | 0.56 | 0.51 | 0.49 | 0.44 |
| 35–10,000Å | 0.52 | 0.57 | 0.51 | 0.49 | 0.46 |

Comparison with pore volume distribution of the alumina powder can be made by referring to the far right of the table wherein the distribution of the powder prior to mixing and extrusion is shown.

For direct comparison to the data of Table 2 wherein extrusion of normal injection velocity powder is shown, high injection velocity powder (511 grams) was mixed with 8 mls of glacial acetic acid and 400 mls of water, mulled 5 minutes and extruded. A second test was made using 511 grams of alumina powder derived from the high injection process mixed with 8 mls of glacial acetic acid and 440 mls of water. The mixture was mulled for 10 minutes and extruded. The results are shown as tests 9 and 10 in Table 3 below. The pore volume of the unextruded powder is shown in the column at the far right of Table 3.

TABLE 3

EXTRUSION OF HIGH INJECTION VELOCITY POWDER

| | 9 | 10 | POWDER |
|---|---|---|---|
| 35–50Å | 0.13 | 0.17 | 0.07 |
| 35–100Å | 0.49 | 0.50 | 0.47 |
| 35–250Å | 0.55 | 0.56 | 0.55 |
| 35–500Å | 0.56 | 0.59 | 0.60 |
| 35–1,000Å | 0.57 | 0.63 | 0.63 |
| 35–10,000Å | 0.58 | 0.65 | 0.88 |

Examination of the comparisons set forth in Tables 2 and 3 will show that extrusion of high pore volume aluminas lowers the pore volume considerably. It can be seen also that slight increases in pore volume occur upon extrusion of the lower pore volume alumina produced under current practices (not high injection).

The comparison using the rotating wheel mechanism with extrusion was made. Initially, spheroidization of normal injection velocity powder (the same as that used for the comparisons in Table 2, commercially sold as CATAPAL SB trademark of and sold by Continental Oil Company) the pore volume of the initial dry powder is the same as that shown in Table 2.

The powder was spheroidized on a rotating wheel (manufactured by Dravo Manufacturing Company) and the following parameters were used in an attempt to alter pore volume distribution. The results are shown in Table 4.

TABLE 4

SPHEROIDIZATION OF NORMAL INJECTION VELOCITY ALUMINA

| PROCEDURE | 11 | 12 | 13 |
|---|---|---|---|
| Powder Rate: | 133.0 g/min | 103.5 g/min | 103.5 g/min |
| Peptizer Rate: | 65.0 g/min | 53.0 g/min | 51.5 g/min |
| Powder/Peptizer Ratio: | 2.046 | 1.953 | 2.0097 |
| Peptizer: | 3% HNO$_3$ | 3% HNO$_3$ | 3% HNO$_3$ |
| Wheel Speed: | 41. RPM | 32 RPM | 35–43 |
| Wheel Angle: | 35.0° | 38.4° | 35.0 |
| PORE VOLUME DISTRIBUTION | | | |
| 35–50Å | .077 | .182 | .180 |
| 35–100Å | .396 | .392 | .404 |
| 35–250Å | .418 | .401 | .415 |
| 35–500Å | .430 | .402 | .415 |
| 35–1,000Å | .438 | .404 | .415 |
| 35–10,000Å | .454 | .424 | .423 |

A direct comparison of Table 4 was made using alumina powder derived from high injection velocity processes. The results are shown in Table 5.

TABLE 5
SPHEROIDIZATION OF HIGH INJECTION VELOCITY ALUMINA

| PROCEDURE | 14 | 15 |
|---|---|---|
| Powder Rate: | 92.5 g/min | 92.5 g/min |
| Peptizer Rate: | 45.5 g/min | 45.5 g/min |
| Powder/Peptizer Ratio: | 2.033 | 2.033 |
| Peptizer: | 3% HNO$_3$ | 3% HNO$_3$ |
| Wheel Speed: | 47 | 47 |
| Wheel Angle: | 38.4 | 38.4 |
| PORE VOLUME DISTRIBUTION | | |
| 35–50Å | .123 | .122 |
| 35–100Å | .337 | .377 |
| 35–250Å | .411 | .456 |
| 35–500Å | .445 | .494 |
| 35–1,000Å | .486 | .542 |
| 35–10,000Å | .810 | .865 |

An examination of the comparative data of Tables 4 and 5 will show that the pore volume of the high injection velocity powder is retained and even slightly increased during spheroidization on a rotating wheel, whereas extrusion lowers the pore volume significantly.

In practice the operation of the rotating wheel must be modified relative to normal alumina powder base for production of spheres from the high injection velocity powder. The wheel speed and/or angle must be increased to achieve stable operation (defined as equivalent dimensionless flow distributions on the wheel). The optimum peptizer, concentration, and/or peptizer powder ratio can also vary for the high injection velocity powder. However, spheres obtained from the rotating wheel based on high injection velocity alumina powder have significantly higher pore volumes (about 0.2 cc/gram higher) than extrudates made from the same powder. The rotating wheel processing conditions can be changed such that the spheres also have a comparable crush strength relative to spheres or extrudates based on the normal injection velocity powder.

While certain embodiments and details have been shown for the purpose of illustrating this invention, it will be apparent to those skilled in this art that various changes and modifications may be made herein without departing from the spirit or the scope of the invention.

We claim:
1. A method for producing alumina spheres having between about 25% and 40% of all pores above 1,000 angstroms in size, comprising
   (a) producing alumina powder by mixing water and aluminum alkoxide at a velocity of from about 40 feet per second to about 250 feet per second, wherein velocity is determined by the formula $V = F/pA$ wherein V is velocity, F is rate of flow in pounds per second, p is density in pounds per cubic foot, and A is orifice area in square feet; passing the admixture into a hydrolysis reactor;
   (b) allowing hydrolysis to occur, removing alumina and drying to obtain a high pore volume powder, and
   (c) dropping the dried high pore volume alumina onto a rotating wheel under a peptizing spray misted onto the wheel.
2. A method as described in claim 1 wherein the peptizing spray is an acid spray selected from the group consisting of nitric acid, acetic acid, and formic acid.
3. A method as described in claim 2 wherein the alumina powder peptizer spray ratio is by weight from about 1.7 to about 2.4 respectively (based on 3% nitric acid in spray).

* * * * *